United States Patent [19]

Schulze-Eyssing et al.

[11] Patent Number: 5,609,421
[45] Date of Patent: Mar. 11, 1997

[54] ROLLED BEARING BUSH AND JOURNAL OR SHAFT CONNECTION WITH SUCH A BEARING BUSH

[75] Inventors: Heinz Schulze-Eyssing, Dielheim; Erhardt Mundil, Walldorf, both of Germany

[73] Assignee: Glyco-Metall-Werke, Glyco B.V. & Co. KG, Wiesbaden, Germany

[21] Appl. No.: 691,473

[22] Filed: Aug. 2, 1996

Related U.S. Application Data

[63] Continuation of Ser. No. 341,580, filed as PCT/DE93/00379 Apr. 28, 1993 published as WO93/22574 Nov. 11, 1993, abandoned.

[30] Foreign Application Priority Data

Apr. 28, 1992 [DE] Germany .......................... 42 13 831.0

[51] Int. Cl.$^6$ ...................................... F16C 33/04

[52] U.S. Cl. ............................................. 384/125; 384/273
[58] Field of Search ................................. 384/125, 202, 384/273, 295, 296, 299, 300

[56] References Cited

FOREIGN PATENT DOCUMENTS 2217585  9/1974  France .
2220023  9/1974  France .

Primary Examiner—Lenard A. Footland
Attorney, Agent, or Firm—Lawrence J. Shurupoff

[57] ABSTRACT

The invention relates to a wrapped bearing bush of elastic material as a bearing for a journal or a shaft for pressing into a housing bore. The invention also relates to a journal or shaft connection comprising a first and a second component, wherein the first component carries a bearing bush and the second component is connected to a journal or shaft mounted in the bearing bush.

5 Claims, 6 Drawing Sheets

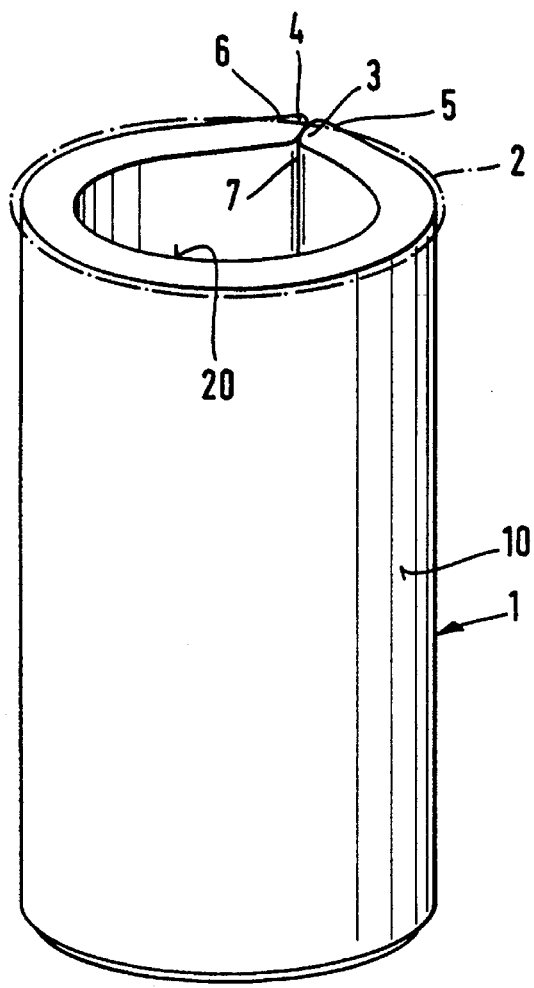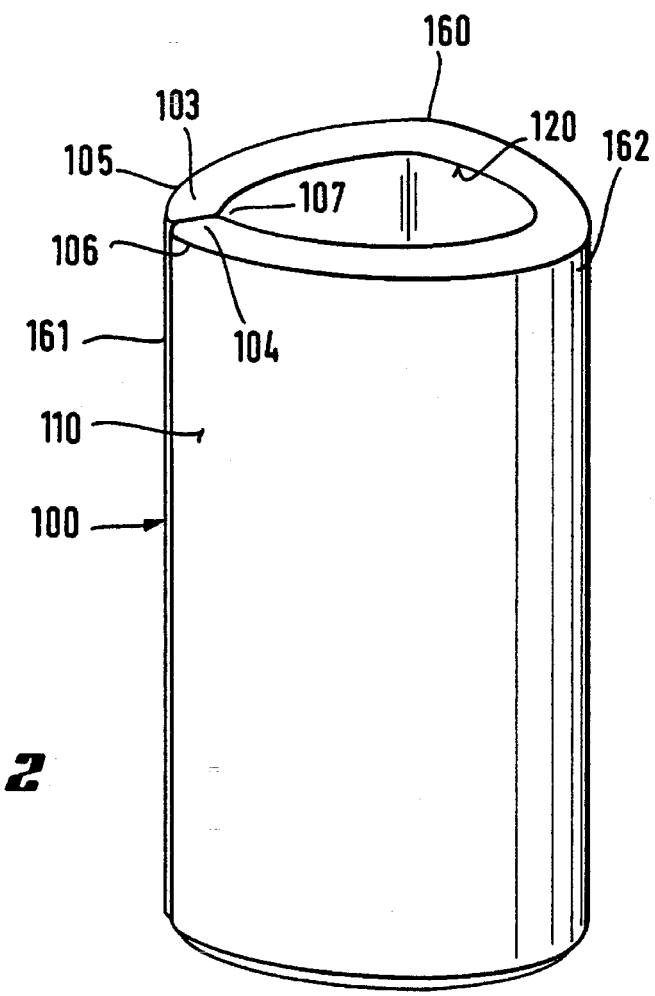

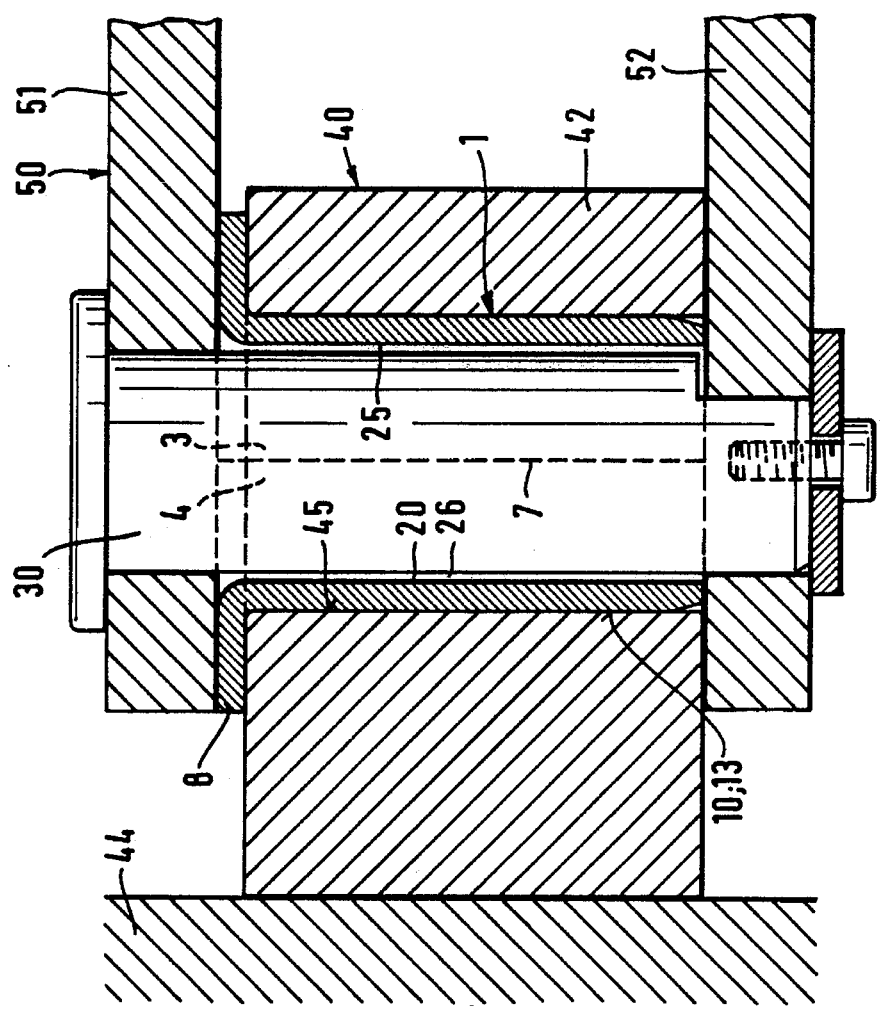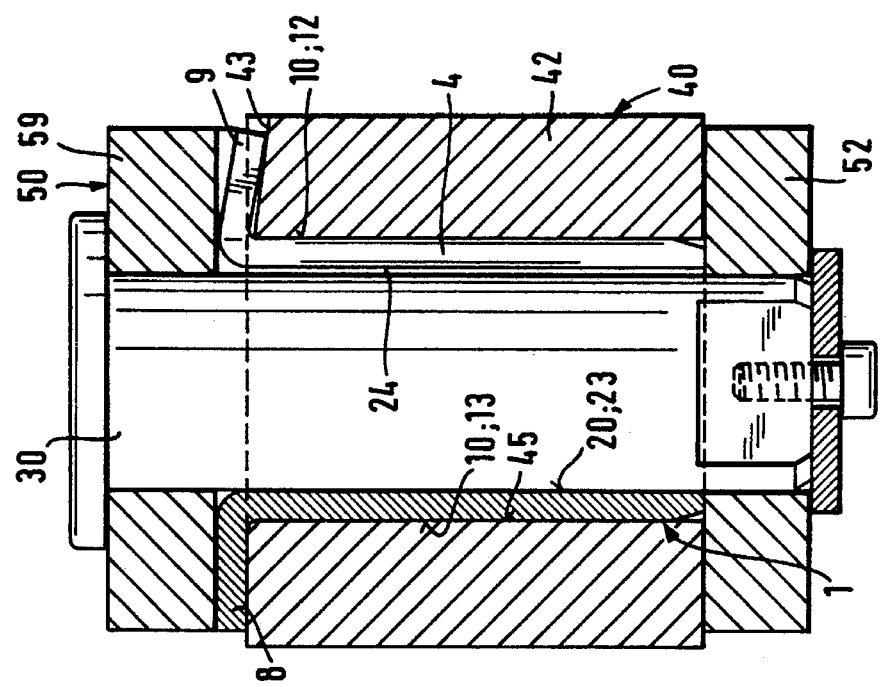

ROLLED BEARING BUSH AND JOURNAL OR SHAFT CONNECTION WITH SUCH A BEARING BUSH

This is a continuation application Ser. No. 08/341,580, filed as PCT/De93/00379 Apr. 28, 1993, published as WO93/22574 Nov. 11, 1993 abandoned.

BACKGROUND OF THE INVENTION

1. Field of the Invention

The invention relates to a wrapped bearing bush of elastic material as a bearing for a journal or a shaft for pressing into a housing bore. The invention also relates to a journal or shaft connection comprising a first and a second component, wherein the first component carries a bearing bush and the second component is connected to a journal or shaft mounted in the bearing bush.

2. Description of Prior Developments

Wrapped bearing bushes are used, among others, in automotive industry for the mounting of motor car doors. In such application the bearing bush is, naturally, not exposed to any high rotational frequencies but must meet other criteria, such as be without clearance and have high load-bearing capacity. Particularly when a car door is open, large radial forces act on the bearing bush due to the weight of the car door.

One such bearing bush is known for instance from DE-OS 40 10 466, which describes a mounting for car doors. Described is a slotted bearing bush with radially outwardly projecting spring tongues the free ends of which engage into a peripheral groove of a pin inserted in the bush. On insertion of the bearing bush, the spring tongues are forced radially outwardly and are thereby pressed onto the surface of the bearing bore. The spring tongues have the disadvantage that after a relatively short time the spring force slackens and the bush is no longer received in the housing bore without clearance. In addition the manufacture of the spring tongues is relatively expensive and the effective bearing surfaces, which are limited to the bearing surfaces of the spring tongues, are not sufficiently large to take up larger forces.

Similar bearing bushes with spring tongues are known from DE-OS 39 01 283.

In DE-PS 14 00 846 is described a plug-in bush of plastics which has outer ribs. On insertion of the bush into a corresponding bore, the ribs are deformed whereby a tight fit in the opening of the workpiece should be achieved. Such arrangement cannot be made with wrapped bushes.

DE-OS 23 03 051 relates to a bearing bush with several slits which has a cylindrical and a conical portion. On introduction of a journal of a shaft the segments of the conical portion are pressed outwardly so that the bearing bush is jammed in the bore. Here only the ends of the segments bear onto the journal so that in operation this area is subject to fast and extensive wear.

DE-OS 37 33 126 describes a wrapped bearing journal with several walls which has in a portion of its peripheral wall a tongue extending in peripheral direction which should even out the difference between the diameters of an opening in the door-holding strip and of the housing bore of the bearing block. This should permit larger tolerances without producing a bearing clearance between the housing bore a the bores in the opening in the door-holding strip. Also this arrangement suffers from the known disadvantages.

From U.S. Pat. No. 3 319 484 is known a mounting for the shaft of a potentiometer which should prevent the shaft from turning by itself when the apparatus, into which is built the potentiometer, vibrates. On the other hand the shaft must turn easily. The bushing has for this reason a recess into which is inserted a spring of a substantially triangular shape such that the round corners of the triangle bear onto the inner side of the recess in the bushing and the arms of the triangle bear onto the shaft. This spring element serves merely as means for preventing turning and has no bearing function which is according to U.S. Pat. No. 3 319 484 taken over by a bushing bore adapted to the shaft.

SUMMARY OF THE INVENTION

The aim of the invention is to devise a wrapped bearing bush which is pressed into the housing bore, while the journal or shaft should be mounted without clearance, and whose bearing surfaces should be larger than in known bearing bushes. In addition the bearing bush should be able to be easily produced. The aim of the invention is also to devise a journal or shaft connection which enables turning of two components without clearance.

This aim is achieved by a bearing bush and by a journal or shaft connection according to the invention. The finished tubular bearing bush body has a substantially circular cross-section. According to the invention departure is made from this circular shape by suitable deformation of the bearing bush, so that some portions of the bush project outwardly relative to the initial circular shape. The suitable deformation need not be in the whole bush, but it is important that the deformed region should extend along the whole length of the bush. This ensures that on insertion of the bearing bush into the housing bore uniform interference fit is obtained along the whole axial length of the bearing bush. According to the state of the art this region is generally limited only to outwardly extending tongues. The deformation according to the invention has therefore the advantage that the shape elasticity of the whole bush may be used which is reflected particularly positively onto the life span of the interference fit. It could be established that the bearing bush has no clearance even after a long-lasting use e.g. in hinges of car doors. In addition the deformation of the bearing bush may be made by simple technical means so that manufacturing costs are within the usual limits.

When the bearing bushes with the suitable deformation are inserted into the housing bore, the portion or portions of the bush which projects or project outwardly relative to the circular shape is or are brought back to the circular shape defined by the housing bore. This produces two advantageous effects.

Firstly, the portions of the outer surface of the bush with which the bush does not bear onto the surface of the housing bore, are purposefully used for the guiding of the journal or shaft. Depending on the kind of deformation, the journal or shaft may additionally also bear onto the inner surface of the bearing bush at portions which are in contact with the surface of the housing bore. The proportion of the peripheral portions which contribute neither to the interference fit nor to the guiding and mounting of the journal or shaft is thereby minimized.

Secondly, by the bearing of the bush onto the surface of the housing bore with area contact, one or more outer bearing surfaces are formed which may take up large radially acting forces and the mounting still remains clearance-free. The size of the bearing area obtained in this way depends on the chosen deformation of the bearing bush. The bearing areas between the bearing bush and the housing bore and also between the bearing bush and the journal or shaft are in all cases larger than is the case with bearing bushes according to the state of the art, so that the load-bearing capacity of the bearing bush is significantly increased.

Two deformations were found to be particularly advantageous.

Due to the manufacturing process the wrapped and not yet calibrated bearing bushes have substantially straight peripheral portions which usually meet at a joint. The straight peripheral portions make an angle of <180°. This arrangement of the peripheral portions, which is the result of the manufacturing process, is usually referred to as roof or "v" shape. The deformation of the bearing bush involves elevation of this roof shape in a desired manner. In this way that the butt ends project so far outwardly relative to the circular shape that, on being inserted into the housing bore, the tubular bearing bush bears with at least half of its outer surface onto the surface of the housing bore. This produces an outer bearing surface which extends over more than half of the periphery of the bearing bush, and the bearing bush bears at the same time also by its butt ends onto the surface of the housing bore. The straight peripheral portions which cannot come into contact with the surface of the housing bore bear simultaneously onto the journal or shaft which, in addition, bears with most of its area in the arc portion onto the inner surface of the bearing bush whose outer surface forms the outer bearing surface. Altogether, due to the produced pretension, most of the total area of the bearing bush bears either onto the surface of the bearing bush (outer bearing surfaces) or onto the pin or journal or shaft to be mounted (inner bearing surfaces).

According to a second embodiment, the deformation is produced in such a way that the bearing bush has a polygonal shape, a polygon with three polygon points being preferred. Between the polygon points the walls of the bush are flattened but still curved and, when the bush is not mounted in, the polygon points project outwardly relative to the circular shape.

This polygonal deformation includes the whole bearing bush, so that when the bush is inserted into the housing bore, the portions of the outer surface of the bearing bush, which are described by the polygon points and extend axially, are pressed radially inwardly. These portions of the outer surface form the outer bearing surfaces, while the wall portions between the polygon points bear by a portion of their inner surfaces onto the journal or shaft to be mounted and form thereby the inner bearing surfaces. By this kind of deformation is obtained a uniform distribution of the bearing surfaces on the whole periphery of the bearing bush. The polygon points are preferably so situated, that one of the polygon points lies in the region of the butt ends.

The deformation of the bearing bush is so arranged that the maximum distance between the outer surface of the bearing bush and the surface of the housing bore is substantially <5/100 mm, preferably <1/100 mm, these values being dependent on the diameter of the bush. This distances apply also to the spaces between the journal or shaft and the inner surface of the bearing bush.

The bearing bush may have a flange, and so as to prevent turning, at least one flange end is bent to engage into a recess situated adjacent the housing bore, or the flange end cooperates with an upset adjacent the housing bore.

The journal or shaft connection according to the invention, which comprises a first and a second component, wherein the first component carries a bearing bush and the second component is connected to a journal or shaft housed in the bearing bush, uses a wrapped bearing bush according to the invention, the bearing bush being so situated in the first component, that the maximum radial force F of the second component acting on the bearing bush engages in the region of one of the outer surfaces and forms thereby a bearing surface.

This purposeful build-in position of the bearing bush is recommended when the bush is subjected to very high loads.

If deformation according to the first embodiment is chosen, which involves elevation of the roof shape, the bearing bush may be so situated in the journal or shaft connection, that the maximum radial force F acts on the bush portion opposite the joint because the outer main bearing surface is there situated.

If deformation according to the second embodiment is chosen, the bearing bush may be so situated, that the maximum radial force F engages in the region of the polygon points.

A preferred field for the use of the journal or shaft connection are hinges, particularly hinges for motorcar doors. In these applications the bearing bush is situated in the journal or shaft connection in such a way, that an outer bearing surface, preferably the outer main bearing surface takes up the radial forces acting when the door is open.

Brief description of the drawing

Embodiment of the invention will now be described in greater detail, by way of example, with reference to the drawings. In the drawings:

FIG. 1 is a perspective illustration of a bearing bush with a deformation according to a first embodiment, FIG. 2 is a perspective illustration of a bearing bush with a deformation according to a second embodiment, FIG. 6, is a section through the journal or shaft connection shown in FIG. 3 along the line VI—VI, FIG. 7 is a section through the journal or shaft connection shown in FIG. 3 along the line VII—VII.

DETAILED DESCRIPTION OF THE PREFERRED EMBODIMENTS

Figure 3:
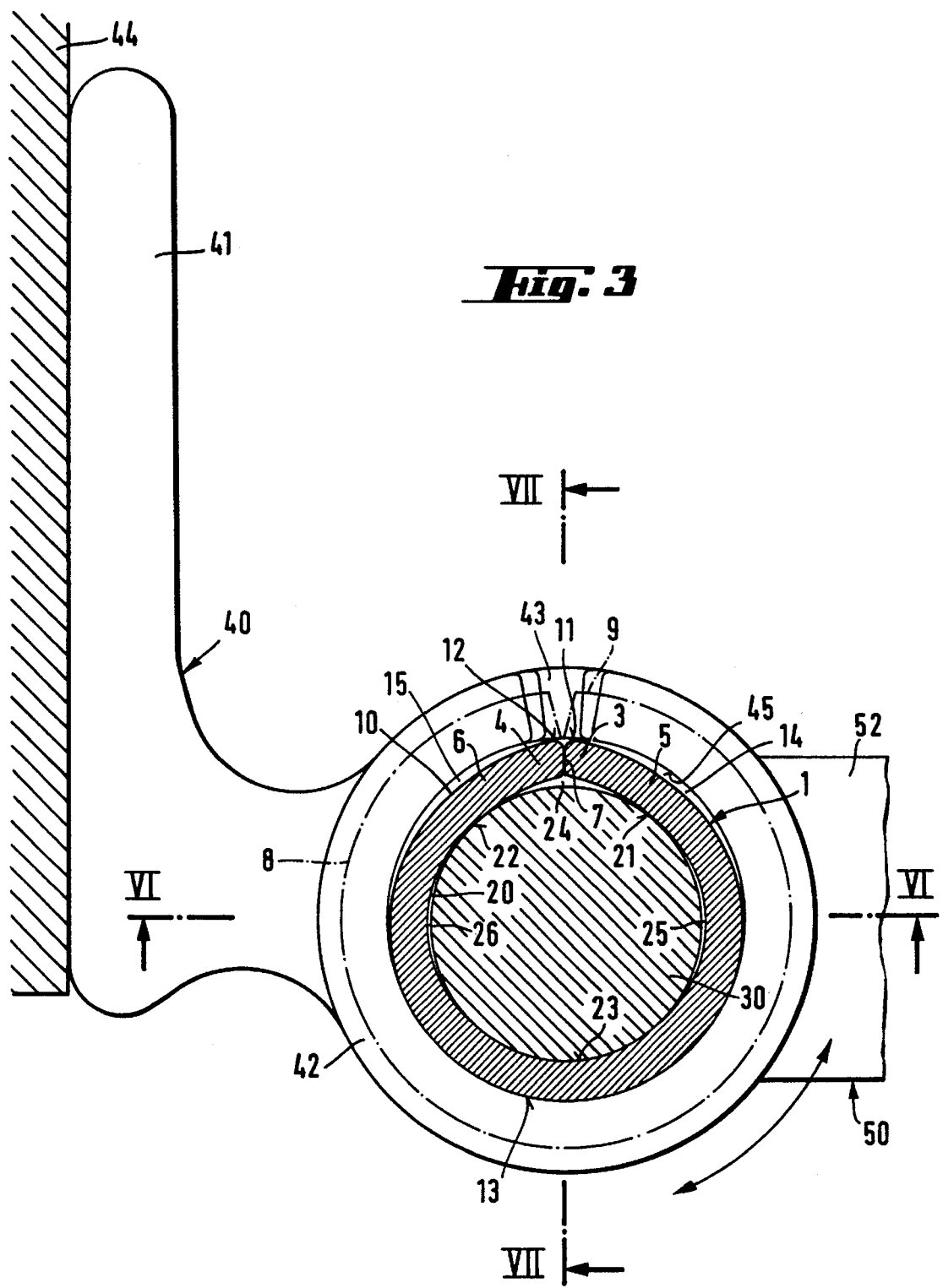
FIG. 3 is a plan view of a journal or shaft connection with a bearing bush according to the first embodiment in a first position.

In FIG. 1 is shown in perspective a wrapped bearing bush 1 with a deformation according to A first embodiment. The bearing bush 1 has at its butt ends 3, 4 substantially straight peripheral portions 5, 6 which meet at the joint 7. The peripheral portions 5, 6 form the earlier described "v" roof-shape, which is so elevated by the suitable deformation that the butt ends 3, 4 project outwardly relative to the circular shape 2.

Figure 8:
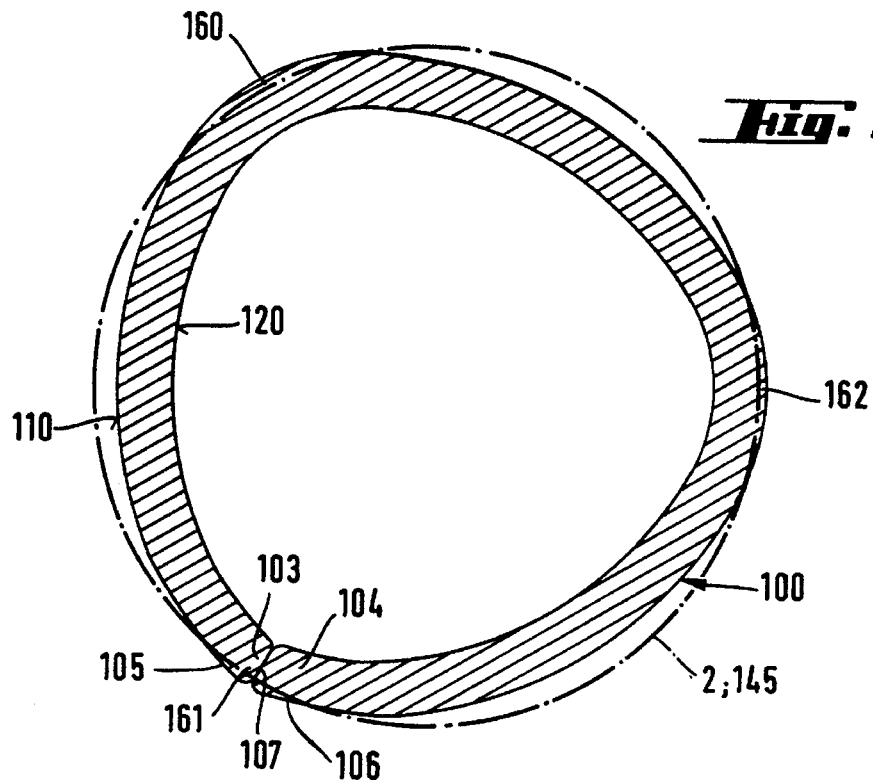
FIG. 8 is a cross-section of a bearing bush according to the second embodiment in non-inserted state.

In FIG. 2 is shown a wrapped bearing bush 100 according to a second embodiment. The bush 100 has in cross-section a polygonal shape comprising three polygon points 160, 161 and 162 which project outwardly relative to the circular shape 2 (FIG. 8). The polygon points 160, 161, 162 are so situated that the polygon point 160 lies in the region of the butt ends 103, 104.

As is apparent from FIGS. 1 and 2, the deformation extends always over the whole length of the bushes 1, 100, so that all cross-sections through the bushes are identical.

Figure 5:
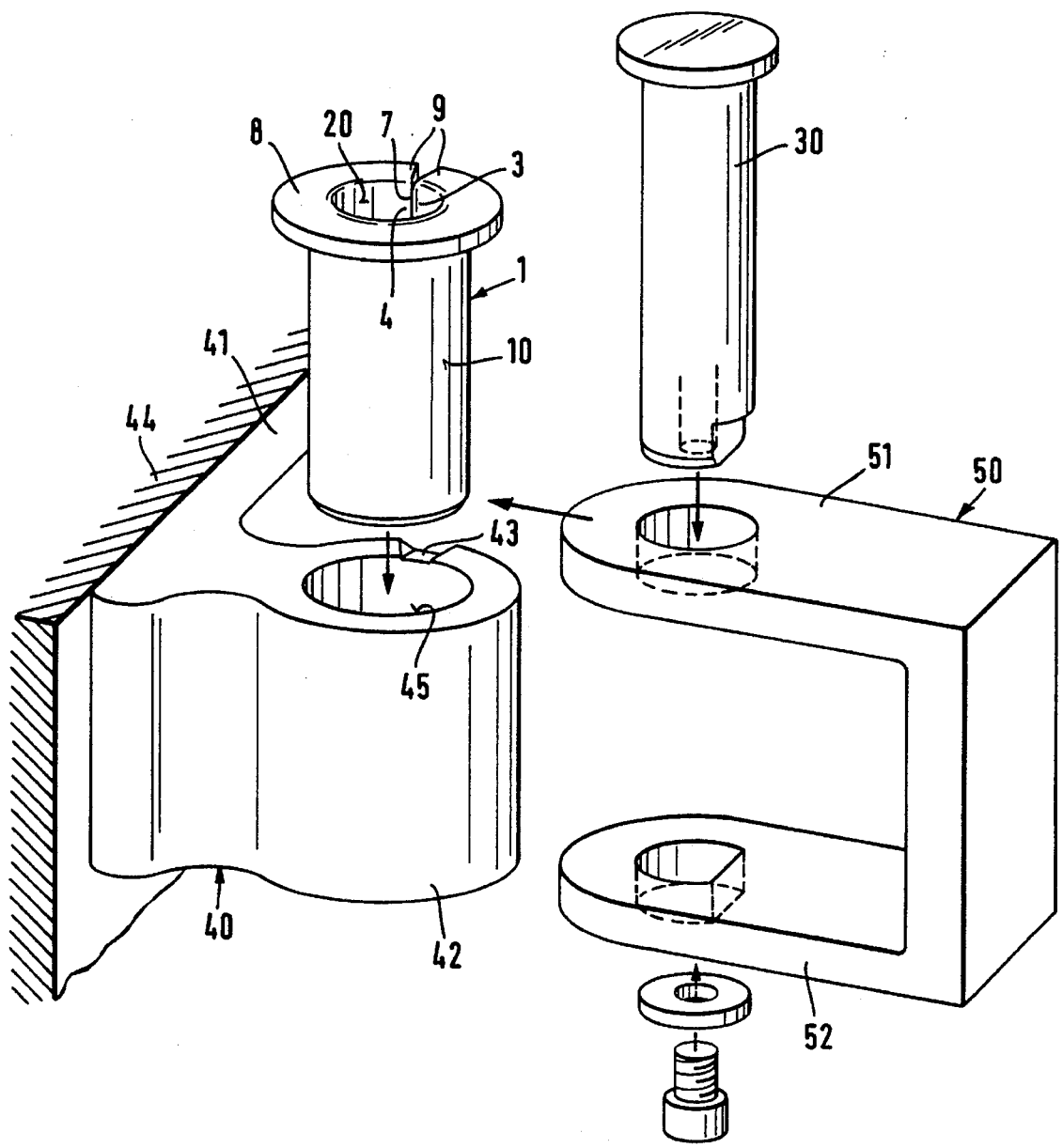
FIG. 5 is a perspective exploded view of a bearing bush according to the first embodiment with hinge parts.

In FIG. 3 is shown the bearing bush 1 in the embodiment according to FIG. 1 used in a connection which is shown in an exploded view in FIG. 5. This journal or shaft connection comprises a first hinge part 40, attached by a hinge plate 41 to a wall 44, a second hinge part 50 and a pin 30. Into a housing bore 45 in a round hinge body 42 is inserted the bush 1 provided with the deformation.

The butt ends 3, 4, which project outwardly relative to the circular shape 2, are [thereby] brought back radially inwardly to the circular shape which is defined by the housing bore 45. Because the circumference is greater than the housing bore, this results in an interference fit, which causes that the bearing bush 1 bears with its outer surface 10 with an area contact onto the surface of the housing bore 45 whereby an outer bearing surface 13 is formed. This outer bearing surface 13 extends over half of the whole periphery of the bearing bush 1.

The bearing bush 1 bears with its butt ends 3, 4 onto the surface of the housing bore 45, whereby [outer] bearing surfaces 11 and 12 are formed. Because, on insertion of the bearing bush 1 into the housing bore 45, the substantially straight peripheral portions 5 and 6 remain largely uninfluenced, outer spaces 14 and 15 are formed between the bearing bush 1 and the surface of the housing bore 45. As a consequence the pin 30 situated in the bearing bush 1 bears with its surface onto the inner surface 20 of the bearing bush in the regions of the straight peripheral portions 5 and 6 (inner bearing surfaces 21, 22). At the same time the pin bears onto the inner surface 20 of the bearing bush 1 (inner bearing surface 23) also in the region which forms the outer bearing surface 13. The outer bearing surface 13 and the inner bearing surface 23, which form in this arrangement the main bearing surfaces, are positioned opposite the joint 7. With the inner bearing surfaces 21, 22, 23 alternate inner clearance spaces 24, 25, 26.

Figure 4:
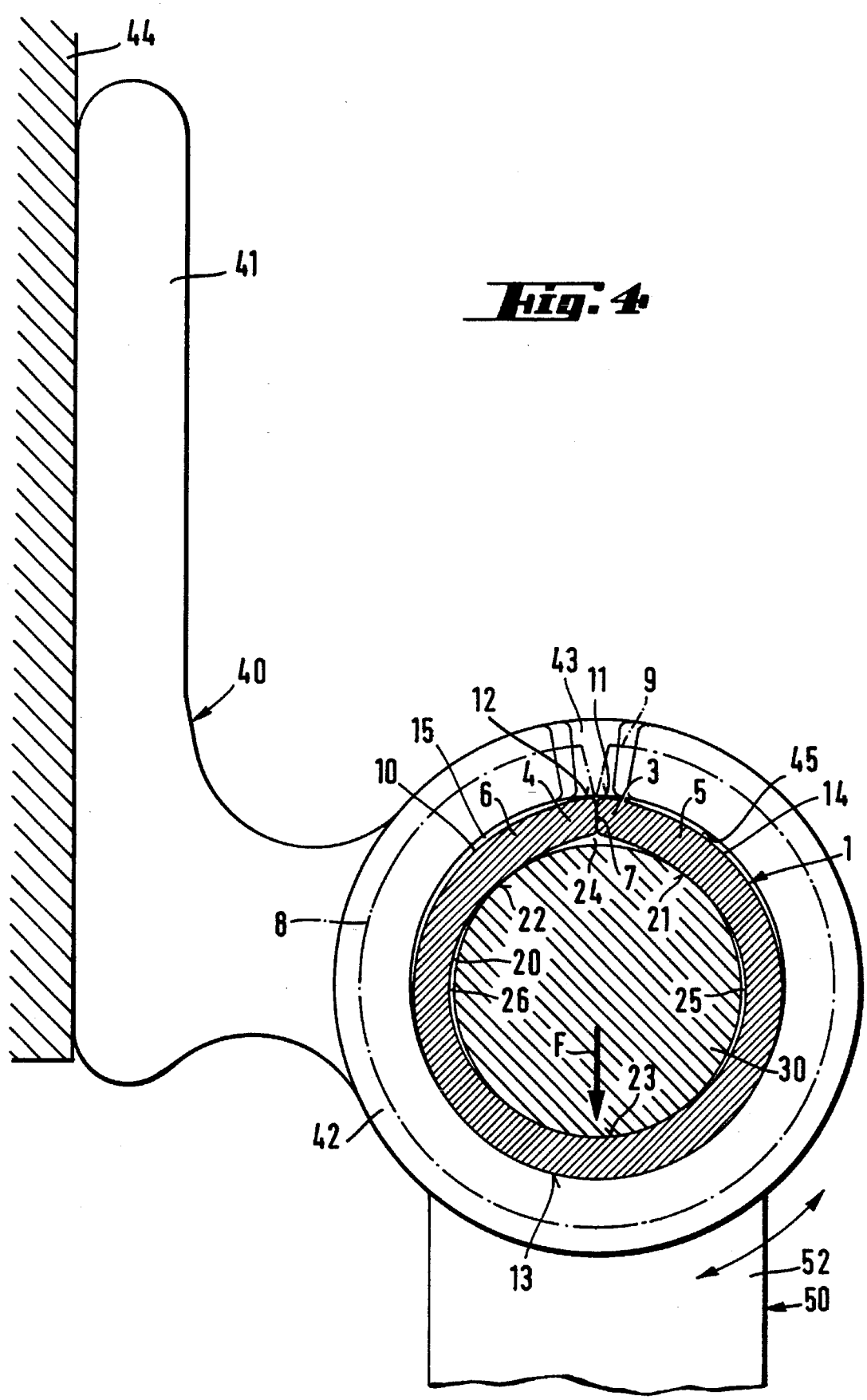
FIG. 4 is a journal or shaft connection according to FIG. 3 in a second position.

The connection shown in the FIGS. 3, 4, 5 could be, for instance, the hinge connection of a car door. In this case the pin 30 would be non-rotatably connected to the upper and lower carrier arms 51, 52 of the second hinge part 50 which are attached to the car door. FIG. 3 would represent the position of the pin connection when the car door is closed.

In FIG. 4 the second hinge part 50 is turned through 90° relative to the position shown in FIG. 3. If the hinge were used for a car door, this position would represent an open door. In this case radial forces F act in the direction of the main bearing surfaces 23 and 13. The region of the inner spaces 25 and 26, and also the outer spaces 14 and 15, where the bearing bush is not in contact with the pin 30 or the surface of the housing bore 45, are therefore largely unloaded.

In FIG. 6 is illustrated the cross-section through the connection shown in FIG. 3 along the line VI—VI. The bush comprises a flange 8 by means of which the bearing bush 1 bears onto the hinge body 42. The inner spaces 25 and 26 are shown exaggerated. In reality the spacing between the housing bore 45 and the pin 30 is in the region of about 1/100 mm.

In FIG. 7 is illustrated the section through the connection shown in FIG. 3 along the line VII—VII, which extends through the joint 7 of the bearing bush 1. The hinge body 42 has in the region of the joint 7 a recess in the form of a notch 43 into which engages the bent end 9 of the flange 8 as means preventing rotation.

Figure 9:
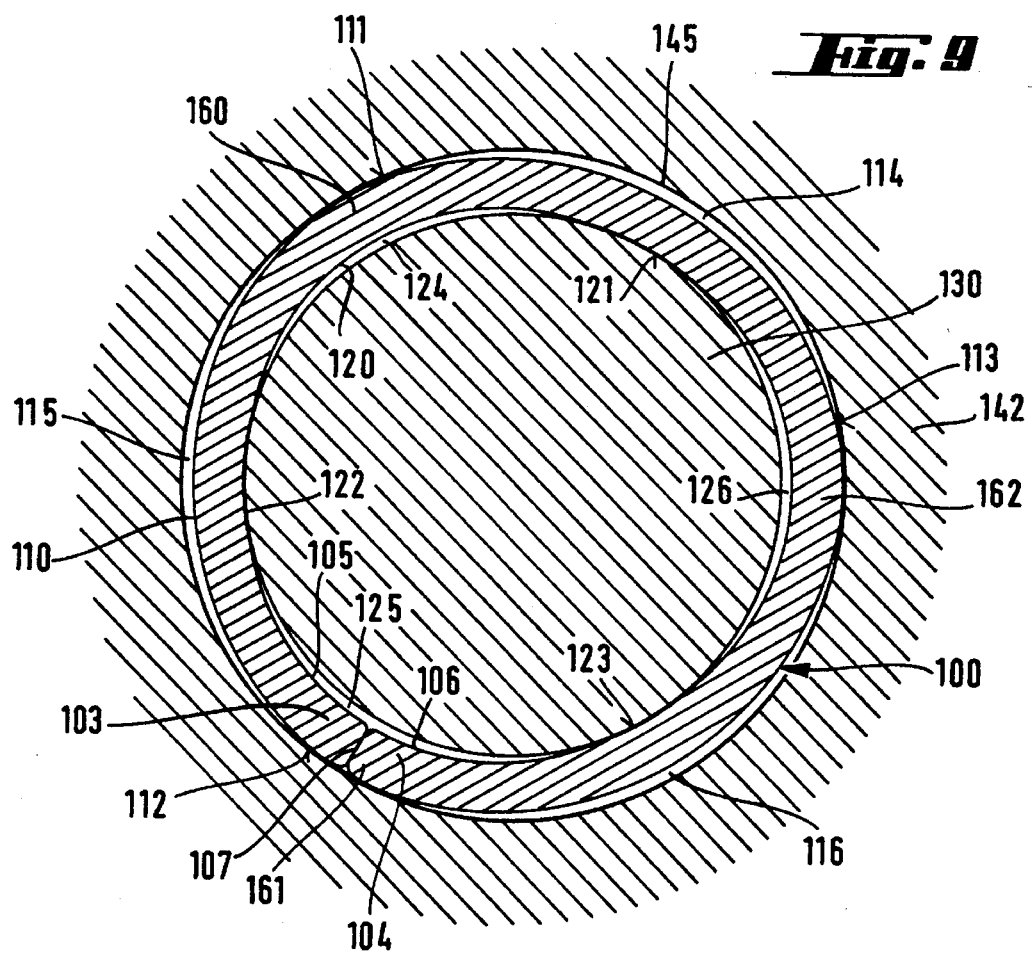
FIG. 9 is a cross-section of a bearing bush according to the second embodiment in inserted state.

In FIGS. 8 and 9 is illustrated a bearing bush 100 according to a the second embodiment. The bearing bush 100, which is shown in FIG. 9 in an installed state, has a polygonal shape with three polygon points 160, 161 and 162. The peripheral portions between the polygon points 160, 161, 162 are flattened but still curved. Between the bearing bush 100 and the hinge body 142 are outer spaces 114, 115 and 116. The bearing bush 100 bears with its outer surface 110 onto the surface of the housing bore 145 whereby outer bearing surfaces 111, 112, 113 are formed. The pin 130 contacts the bearing bush at the inner bearing surfaces 121, 122, 123 which are situated between the polygon points 160, 161 and 162 and therefore alternate with the outer bearing surfaces 111, 112, 113.

We claim:

1. A bush, comprising:
  a tubular body having a substantially circular cross section, said body comprising a pair of abutted touching end portions defining an axially-extending butt joint, said butt joint having a V-shaped profile extending radially outwardly beyond said circular cross section for engaging a housing and elastically deforming said tubular body during installation of said bush into said housing.

2. The bush of claim 1, wherein said substantially circular cross section comprises a polygonal cross section.

3. A bush assembly, comprising:
  a housing having a circular bore formed therein;
  a circular shaft mounted within said bore; and
  a bush mounted between said bore and said shaft, said bush comprising a tubular body with a substantially circular cross section and having an inner surface supporting said shaft and an outer surface having an interference fit within said bore, said bush further comprising a pair of abutted touching end portions defining an axially-extending butt joint pressed within said bore, said butt joint having a V-shaped profile defined by a pair of substantially straight peripheral portions of said bush, said bush defining a clearance space between said shaft and said inner surface adjacent said straight peripheral portions.

4. The assembly of claim 3, wherein said shaft engages a portion of said inner surface located opposite from said butt joint.

5. The assembly of claim 4, wherein said outer surface respectively defines a pair of clearance spaces between said bush and said bore adjacent said straight peripheral portions.

* * * * *